US012083525B2

(12) United States Patent
Ghirardi

(10) Patent No.: US 12,083,525 B2
(45) Date of Patent: Sep. 10, 2024

(54) METHOD AND PLANT FOR THE PROCESSING OF WASTE

(71) Applicant: WPT S.R.L., Collegno (IT)

(72) Inventor: Simone Ghirardi, Rome (IT)

(73) Assignee: WPT S.R.L., Collegno (IT)

( * ) Notice: Subject to any disclaimer, the term of this patent is extended or adjusted under 35 U.S.C. 154(b) by 361 days.

(21) Appl. No.: 17/609,835

(22) PCT Filed: May 15, 2020

(86) PCT No.: PCT/IB2020/054630

§ 371 (c)(1),
(2) Date: Nov. 9, 2021

(87) PCT Pub. No.: WO2020/234723

PCT Pub. Date: Nov. 26, 2020

(65) Prior Publication Data

US 2022/0241794 A1 Aug. 4, 2022

(30) Foreign Application Priority Data

May 17, 2019 (IT) ........................ 102019000006959

(51) Int. Cl.
*B02C 13/18* (2006.01)
*B02C 13/26* (2006.01)
(Continued)

(52) U.S. Cl.
CPC .......... *B02C 13/18* (2013.01); *B02C 13/2804* (2013.01); *B02C 13/288* (2013.01);
(Continued)

(58) Field of Classification Search
CPC ... B02C 13/288; B02C 13/18; B02C 13/2804; B02C 13/26; B02C 19/0075;
(Continued)

(56) References Cited

U.S. PATENT DOCUMENTS 5,470,022 A 11/1995 Wright et al.
6,928,799 B2 8/2005 Nwosu et al.
(Continued)

FOREIGN PATENT DOCUMENTS

CN 2186604 Y 1/1995
CN 2741684 Y 11/2005
(Continued)

OTHER PUBLICATIONS

English translate (CN109499700A), retrieved date Dec. 26, 2023.*
(Continued)

*Primary Examiner* — Mohammed S. Alawadi
(74) *Attorney, Agent, or Firm* — Howson & Howson LLP

(57) ABSTRACT

A plant for the processing of waste includes an outer housing and a grinding cell, in which a grinding chamber is defined having at least one inlet opening for introducing the waste to be processed, and at least one outlet opening for discharging the material resulting from waste processing. The openings are associated with a corresponding closure element, adapted to isolate the grinding chamber from the outer environment. The outer housing defines therein a space receiving the grinding cell and integrally surrounds the grinding cell, and in which the space is accessible through at least one door.

15 Claims, 7 Drawing Sheets

(51) Int. Cl.

| | |
|---|---|
| ***B02C 13/28*** | (2006.01) |
| ***B02C 13/288*** | (2006.01) |
| ***B02C 18/00*** | (2006.01) |
| ***B02C 18/16*** | (2006.01) |
| ***B02C 19/00*** | (2006.01) |
| ***B04C 9/00*** | (2006.01) |
| ***B08B 9/00*** | (2006.01) |
| ***B08B 15/04*** | (2006.01) |

(52) U.S. Cl.
CPC ............ *B02C 19/0075* (2013.01); *B04C 9/00* (2013.01); *B08B 15/04* (2013.01); *B02C 2201/06* (2013.01)

(58) Field of Classification Search
CPC .......... B02C 2201/06; B02C 2018/162; B02C 18/16; B02C 18/0084; B04C 9/00; B08B 15/04
See application file for complete search history.

(56) References Cited

U.S. PATENT DOCUMENTS

| | | | | |
|---|---|---|---|---|
| 9,676,012 | B2 | 6/2017 | Bell et al. | |
| 2003/0111568 | A1 | 6/2003 | Coert et al. | |
| 2013/0199424 | A1* | 8/2013 | Abraham | B02C 13/14 110/224 |
| 2013/0233955 | A1 | 9/2013 | Morrow et al. | |
| 2016/0051851 | A1* | 2/2016 | Bell | A61L 2/07 241/62 |
| 2017/0326602 | A1 | 11/2017 | Peng et al. | |

FOREIGN PATENT DOCUMENTS

| | | | | | |
|---|---|---|---|---|---|
| CN | 201158597 | Y | | 12/2008 | |
| CN | 105170290 | A | | 12/2015 | |
| CN | 106334599 | A | | 1/2017 | |
| CN | 108325611 | A | * | 7/2018 | B02C 18/14 |
| CN | 207756222 | U | * | 8/2018 | |
| CN | 109499700 | A | * | 3/2019 | |
| CN | 208574697 | U | | 3/2019 | |
| DE | 202017001459 | U1 | * | 7/2017 | |
| DE | 202017001459 | U1 | | 7/2017 | |
| EP | 2628543 | A1 | | 8/2013 | |
| GB | 277185 | A | | 9/1927 | |

OTHER PUBLICATIONS

English translate (DE202017001459U1), retrieved date Dec. 26, 2023.*
English translate (CN207756222U), retrieved date Dec. 26, 2023.*
English translate (CN108325611A), retrieved date Apr. 21, 2024.*
International Search Report and Written Opinion of the International Searching Authority issued for International PCT Application No. PCT/IB2020/054630 on Sep. 8, 2020.

* cited by examiner

METHOD AND PLANT FOR THE PROCESSING OF WASTE

TECHNICAL FIELD

The present invention relates to a plant and a method for the processing of waste. More particularly, but not exclusively, the invention relates to a plant and a method for the processing of waste in remote environments such as, for example, on board vessels, on oil platforms and the like. The invention lends itself to the processing of waste of substantially any nature, whether undifferentiated waste, waste from recycling sorting and special waste such as hospital waste or waste from industrial processes.

BACKGROUND ART

Waste processing apparatuses are described for example in US 2017/0326602 and DE202017001459 (U1). These apparatuses mainly comprise a cell in which the waste to be processed is subjected to a grinding and shredding step. The cell typically consists of a cylindrical vessel open at the top and provided with a lid. A cutting unit is arranged inside the cell, comprising one or more rotating blades driven by an electric motor. In these apparatuses, the material to be processed, for example hospital waste, is loaded into the cell from above, after the lid has been opened. Thereafter, the lid is closed and the blades are driven to perform the intended processing. After the processing, the solid material which has formed within the cell is removed through a lower opening and, subsequently, the upper cover of the cell is opened to allow loading a new batch of waste.

This type of waste processing apparatus typically results in the production of so-called "piped" and "non-piped" emissions. The piped emissions are those generated by the processing of the waste in the hermetically sealed cell and conveyed to an effluent processing system, usually through a vacuum pump and a circuit associated thereto.

The piped emissions are due to the processing of the waste inside the apparatus and are mainly generated by the evaporation of the moisture and compounds contained in the processed waste, which are volatile at the process temperature. The effluent is evacuated from the chamber defined inside the cell by means of a liquid-ring vacuum pump that contributes, thanks to the mixing with a cooling fluid, to the condensation of most of the steam.

The non-piped emissions, or due to leakage, are those generated by the exposure to the outer environment of the chamber defined inside the cell, either through the inlet opening into the cell for the waste, or through evacuation or discharge opening from the cell for the processed waste. These emissions consist mainly of dust and other volatile substances present in the processing chamber defined in the cell and may contaminate the outer environment. The contamination of the environment surrounding the apparatus creates an undesirable risk of inhalation of harmful substances by workers and of accumulation of dust and volatile substances in difficult-to-reach areas, for example along ducts and pipes, with the possibility of triggering, in certain circumstances, self-combustion phenomena. Last but not least, the accumulation of dust can sometimes lead to the malfunction of electronic devices installed in the environment surrounding the waste processing plant. Examples of devices subject to this risk are fire sensors that can be deceived by the presence of dust accumulated on the surfaces of the sensors.

It is therefore clear that the capture of the non-piped emissions is essential for reducing the risks associated with the exposure of workers to powder, fibres and other volatile contaminants.

A first object of the invention is therefore to overcome the drawbacks of the prior art by providing a waste processing plant and a method which is of low environmental impact and which reduces the risks to operators and personnel operating nearby.

Another object of the invention is to provide a plant and a method of the above-mentioned type, adapted to convert the waste into a dried processed material, of considerably reduced volume compared to the input volume of waste and which can therefore be stored for a long period of time.

The apparatuses of known type, which provide for the grinding of waste thanks to the action of rotors arranged inside the chamber defined in the processing cell, are affected by frequent blockages and interruptions due to the so-called phenomenon of jamming, i.e. the excessive and localised accumulation of shredded material. Many attempts have been made in the past to solve this problem, but the solutions adopted thus far have not been satisfactory.

A further problem that the present invention aims to solve is therefore how to avoid said jamming, while retaining a high grinding and shredding capacity on any type of waste.

As is well known, the apparatuses intended for the processing of waste, in particular of the type intended to operate, for example, on board vessels, in remote areas or in existing structures and buildings, often need to be installed in places that are difficult to access, or accessible only through small passageways. The apparatuses made according to prior art are however cumbersome and therefore must frequently be set up directly on site, with a considerable increase in costs and installation, testing and maintenance time.

A further object of the invention is therefore to provide a plant for the processing of waste, which is compact and easily transportable and which can therefore be easily installed even in places which are difficult to access.

Last but not least, the object of the invention is to provide a plant and a method for the processing of waste, which is reliable and safe and can be manufactured industrially at reasonable cost.

These and other objects of the invention are obtained with the plant and with the method as claimed in the appended claims, which form an integral part of the technical description provided herein concerning the invention.

DESCRIPTION OF THE INVENTION

The plant according to the invention is advantageously able to process waste in a safe and environmentally friendly way and with high energy efficiency.

The plant for the processing of waste according to the invention mainly comprises an outer housing and a processing or grinding cell received inside the housing. A grinding chamber is defined in the cell, which camber is provided with at least one inlet opening or mouth, for introducing the waste to be processed, and at least one outlet opening or mouth, for discharging the material resulting from the waste processing. The inlet and outlet openings are associated with a corresponding closure element, adapted to isolate the grinding chamber from the outer environment. Said closure element may consist, for example, of a lid, or a hatch, or a bulkhead and will preferably be driven by an actuator controlled electronically by a control unit responsible for coordinating the operating cycles of the plant.

Advantageously, according to the invention, the outer housing defines therein a space receiving the cell, which is therefore substantially entirely surrounded by the housing. The access to the space receiving the cell can preferably be via one or more doors. Preferably, according to the invention, the door is configured to ensure the hermetic seal when closed and thereby prevent the passage of dust and other volatile compounds generated in the space, to the outside of the housing.

Preferably, the outer housing comprises a support frame and a plurality of panels attached to the frame. The panels therefore define the walls of the space in which the cell is received and at least one of said panels may consist of said openable door to access the space.

The outer housing preferably further defines therein a collection chamber for the material discharged from the grinding cell at the end of the waste processing process. The collection chamber is furthermore in communication with the grinding chamber defined within the cell through a duct. The duct that puts the chamber of the cell in communication with the collection chamber is preferably closable by means of a movable bulkhead, so as to isolate the cell with respect to the collection chamber. The collection chamber is preferably accessible from the outside through a door that can be opened for the removal of the processed material deposited in the collection chamber.

The grinding chamber advantageously houses a rotor provided with at least one radial vane. Preferably, there are two vanes and they are arranged diametrically opposite. The vanes are also equipped at the end distal relative to the rotation axis with a hammerhead. According to the invention, advantageously in the hammerhead of at least one vane carried by the rotor, two impact surfaces are defined, opposite and preferably different from each other. These opposite impact surfaces operate, respectively, when the rotor rotates clockwise or counter-clockwise. According to a preferred embodiment of the invention, a first impact surface is substantially flat and perpendicular to the angular direction of rotation of the vane, while the other impact surface is preferably variously inclined and even more preferably wedge-shaped or shaped such as to define a sharp impact edge.

Advantageously, according to the invention, the housing preferably houses a system capable of generating a washing air flow of the space housing the cell. Said washing air flow is advantageously conveyed into an effluent processing system of which the plant according to the invention is preferably equipped.

The grinding cell is further preferably equipped with at least three temperature sensors arranged along corresponding generatrices of the cell chamber angularly spaced from one another preferably by about 120°. According to a preferred embodiment of the invention, the sensors are positioned at different heights, namely at different heights relative to the base of the cell, and are adapted to generate a corresponding signal indicative of the temperature measured inside the cell. The signal generated by the sensors is processed by the control unit to generate an average temperature value inside the cell. The average temperature value is advantageously processed and compared with at least one temperature threshold, to trigger the eventual stop of the rotor, if said predetermined threshold is exceeded.

Advantageously, according to a preferred embodiment of the invention, the temperature sensors are placed in corresponding radial bores, or channels, provided in the cell wall. Said sensors are therefore substantially facing in said channels in communication with the chamber defined in the cell, to the advantage of the sensitivity and precision of the temperature measurement. Preferably, the cell further comprises at least two series of sensors, each series preferably comprising at least three sensors, to ensure the temperature control even with the failure of one or more sensors of one of the series.

The method for the processing of waste operating with the plant according to the invention preferably comprises the following steps:

- activating a washing air flow of the space housing the cell;
- opening the inlet opening of the cell;
- opening the door in order to access the space in which the cell is housed;
- loading the cell with a certain amount of waste;
- closing the inlet opening of the cell;
- closing the door for isolating the space receiving the cell;
- starting the grinding step.

Also according to the invention, the method preferably further comprises the following steps:

- stopping the grinding step;
- opening the discharge duct;
- discharging the solid ground material into the collection chamber;
- closing the discharge duct;
- activating a washing air flow of the space receiving the cell.

Again according to the invention, preferably, the grinding step comprises:

- a first step in which the rotor is rotated in a first, clockwise or counter-clockwise direction for operating on the waste with a first impact surface of a vane associated with the rotor;
- a second step in which the rotor is rotated in the opposite direction for operating with a second impact surface different than the first impact surface of a vane associated with the rotor.

Preferably, according to the invention, in the step of rotation in the first direction, the rotor is driven at a constant speed, and in the second step of rotation in the second direction, opposite the first, the rotor is driven at a constant torque.

Preferably, according to the invention, the method further provides a step in which inside the housing, an upward air flow is generated passing through the space housing the cell and, by brushing the lateral surface of the cell, contributing to the cooling thereof. Said upward air flow is also maintained during the loading step of the cell, to prevent the release of dust from the space through the opening provided in the housing through which the operator introduces the waste to be processed. In this step it is evident that the air flow of the upward flow enters mainly through the access opening to the space housing the cell, thus helping to drag into the space itself any volatile substances that may be present in the area in which the operator responsible for loading the processed material operates.

Furthermore, according to the invention, preferably the method provides a step in which the access door to the collection chamber is opened and the material processed therein can be picked up by an operator. Also in this step, according to the invention, the upward air flow is advantageously maintained to prevent the exit of volatile material from the housing during the discharge operation of the collection chamber. In this step it is evident that the air flow of the upward flow enters mainly through the access opening to the collection chamber, thus helping to drag into the chamber itself any volatile substances that may be present in the area in which the operator responsible for discharging the processed material operates.

Preferably, according to the invention, the outer housing defines a space that substantially houses therein all the components of the plant and, in particular, the grinding cell in which the entire waste processing process takes place, a processing system of the effluents coming from the waste processing process and a plurality of auxiliary systems required by the process.

Preferably, the components of the plant are associated with the frame of the housing and the panels are configured to close the space defined in the outer housing. Preferably all the sides of the housing are closed by panels and special grilles or openings can be provided for the inlet and outlet of the air defining the upward washing flow. The housing is further preferably in the form of a parallelepiped and may consist of a combination of modular elements associated with each other. The frame is preferably obtained by welding together steel, box-like elements, even more preferably made of an austenitic stainless steel alloy. The panels preferably comprise a, sound-absorbing inner core, which is coated, at least on the face intended to remain outside the housing, with a stainless steel sheet. The sound-absorbing core is preferably made of a multilayer material, adapted to ensure adequate soundproofing and thermal insulation. Preferably, the inner face of the panels is coated with a high-reflection aluminium foil.

Advantageously, according to the invention, the space defined in the outer housing comprises a loading section and a discharge section substantially isolated from the outer environment.

The loading section substantially corresponds to the volume surrounding the inlet opening or mouth of the grinding chamber defined in the cell. The waste is introduced through the inlet opening into the chamber in order to be ground. The inlet opening is preferably positioned at the top of the cell and is associated with a lid. In a preferred embodiment of the invention, the loading section of the space is surrounded by walls defined by a combination of septa or panels, some of which may preferably be removable to facilitate access to the remaining sections of the space inside the housing. The loading section of the space further comprises an opening closed by a door, preferably positioned frontally, to allow access to the inlet opening of the grinding chamber and, consequently, the introduction of waste into the processing chamber by an operator located outside the housing. The loading section access door may preferably be hinged to the frame of the outer housing, or may be removable. Furthermore, the door is preferably manually operated, but could also be automated and operated by an actuator controlled by the electronic unit of the plant.

According to the invention, advantageously, the loading section of the space is associated with a circuit of an air treatment unit for extracting dust and odours that form in the loading section. Preferably, the loading section of the space is connected to said circuit by an air intake, made in the form of a grille, placed in one of the walls of the loading section of the space.

The discharge section of the space substantially corresponds to the discharge volume or chamber in which the material discharged from the processing chamber is collected and substantially corresponds to the waste that has undergone the processing in said processing chamber. The discharge section is advantageously surrounded by walls defined by septa or panels and comprises an opening, preferably positioned frontally and on the same face as the housing on which the access hatch to the loading section of the space is provided, for extracting the material collected in the discharge section from the system. The opening of the discharge section of the space is preferably closed by a door that can be opened manually or controlled by an actuator.

Inside the discharge section of the space defined in the housing a removable container is preferably provided, for example a tank, possibly equipped with wheels, thanks to which the deposited material can be delivered to the outside of the system. The discharge section also communicates with the processing chamber, preferably through a duct associated with a movable bulkhead controlled by an actuator controlled by a control unit responsible for coordinating the functions of the plant. Even more preferably, the duct comprises a flexible portion, for example represented by a seal in elastic material, adapted to accommodate displacements of the processing chamber, due to vibrations induced by the waste processing during the high-speed rotation of the vanes associated with the rotor.

The processing chamber is defined inside a unit or cell and substantially comprises a waste grinder. In a preferred embodiment of the invention, the waste grinder mainly comprises a monolithic cylindrical drum, preferably made of low-carbon stainless steel and provided with a highly wear-resistant protective inner coating. In use, the drum is oriented with its axis vertically oriented relative to the support plane of the processing plant. Inside the drum is defined the processing chamber housing a rotor provided with one or more rotating vanes, preferably a pair of rotating vanes arranged near the bottom of the chamber.

Optionally, the cylindrical drum is provided on the outer surface of its side wall with a heater comprising an electrical resistance adapted to cause the temperature to rise in the chamber inside the cell to more effectively promote the waste processing and transformation process.

The volume of the processing chamber defined inside the cell may preferably be at least 100 l and more preferably at least 200 l.

According to the invention, advantageously, the rotating vanes are configured so as to minimize the risk of jamming due to the excessive accumulation of material to be processed. The shape of the vanes is advantageously adapted to squeeze and crush the waste contained in the processing chamber thanks to the shock force and impact and preferably without the use of blades or knives, notoriously the main cause of jamming.

The drum is open at the top and is provided with a hinged lid, preferably provided with an actuator controlled by the electronic unit responsible for coordinating the functions of the plant.

Advantageously, according to the invention, the processing chamber, in use, is substantially sealed and kept in depression with respect to the outer environment throughout the waste processing process. Advantageously, again according to the invention, to ensure the appropriate depression conditions inside the chamber during the processing of waste and therefore the necessary hermetic seal of the chamber, the seal is automatically verified at the beginning of each processing cycle and an alarm signal is eventually emitted in the event that the test has not been passed.

According to a particular embodiment of the invention, the effluent extracted from the processing chamber by the vacuum pump and representing the piped emission of the plant, is preferably processed in a multi-stage unit comprising mainly, in the crossing direction of the effluent flow, preferably the following stages:

- a cyclone separator stage, adapted to remove the larger solid particles and condensed moisture contained in the material flow extracted from the processing chamber;
- a wet washing stage, adapted to capture and remove the finer powder particles and droplets of liquid from the flow;
- a demister stage, adapted to remove the mist from the flow downstream of the wet washing stage and aimed at increasing the performance of the subsequent stages;
- a drying stage, to reduce the moisture content (absolute humidity) of the flow downstream of the demister;
- a desaturation stage, to reduce the relative humidity of the flow downstream of the drying stage and aimed at improving the efficiency and useful life of the subsequent stages;
- an adsorption stage (HEPA), adapted to remove any particles or bacteria having a size greater than or equal to 0.3 μm from the flow;
- an adsorption stage, adapted to separate volatile gaseous compounds, odour molecules and any chemicals in the vapour state from the effluent flow in transit; preferably this stage comprises a large activated-carbon filtration stage (HEGA), configured to adsorb a wide range of pollutants and odour molecules;
- a discharge stage, for the discharge into the outer environment of the purified air flow after having undergone the preceding stages.

According to a preferred embodiment of the invention, the cyclone separator stage, the wet washing stage and the demister stage are integrated in a vertically extending multi-stage separation unit. Advantageously, the cyclone stage is adapted to remove the larger particles from the flow in transit, which could cause the clogging or packing of the following wet washing stage, caused by the generation of preferential paths of the effluent flow due to the accumulation of solid substance.

Always according to a preferred embodiment of the invention, the air filtration takes place through a filtration unit.

According to a preferred embodiment of the invention, the non-piped emissions are preferably controlled by a system of powder and odour extraction and filtering. The emissions intercepted by this system are processed in a filtration unit which preferably comprises mainly the following stages:

- a primary coarse filtration stage with mesh installed in a panel surrounding the loading and discharge sections to prevent the entry into the extraction system of particles of excessive size which could clog the filters provided in the subsequent stages;
- a secondary coarse filtration stage installed in a panel surrounding the loading and discharge sections downstream of the primary coarse filter; preferably this stage includes a washable stainless steel mesh filter;
- an adsorption stage (HEPA), adapted to remove any particles or bacteria with a size greater than or equal to 0.3 μm from the flow in transit;
- an adsorption stage for separating the gases, volatile organic compounds, odour molecules and any water vapours from the transiting flow; preferably this stage comprises a large activated-carbon filtration stage, configured to adsorb a wide range of pollutants and odour molecules;
- a discharge stage, for the discharge into the outer environment of the purified air flow after having undergone the preceding stages.

The powder and odour extraction and filtration system preferably comprises four operating modes activated, preferably automatically, depending on the process step running at that time and controlled by the electronic control unit responsible for coordinating the functions of the plant.

A first operation mode provides for the extraction of heat from the processing chamber provided in the cell, to avoid the excessive increase of the temperature in said cell. The air sucked by a suction unit preferably placed at the top of the plant enters the plant through dedicated openings provided at the base of the housing, crosses the space defined inside the housing, brushing the surfaces that the air flow encounters during transit and thus subtracting heat. The air flow sucked by the suction unit is filtered by the air treatment unit with which the plant is provided and is finally released into the outer environment surrounding the plant. Advantageously, according to the invention, a piping is defined in the space that surrounds the cell of the processing chamber for the air flow flowing from the bottom to the suction unit.

A second operation mode provides for removing the dust that are created inside the loading section of the space, when the lid of the processing chamber is opened at the end of the waste processing. The air flow path is substantially the same as in the first described mode.

A third operation mode provides for sucking air from the loading section of the space during the loading of waste when the access door to said loading section of the space is open. In this mode, the air sucked by the suction unit enters the access opening to the loading section of the space at a speed suitable to prevent dust and volatile components from exiting the loading section. The sucked air flow is then filtered, similarly to that which occurs in the previous modes.

A fourth operation mode provides for the suction of air from the discharge section of the space during the discharge of the waste when the access door to said discharge section is open. In this mode, the air sucked by the suction unit enters the access opening to the discharge section of the space at a speed suitable to prevent dust and volatile components from exiting the discharge section. The sucked air flow passes through the discharge section, the communication duct with the processing chamber, the discharge outlet, the processing chamber and exits into the loading section through the opening or loading mouth provided to access the processing chamber. The air flow flowing outside the processing chamber is subsequently filtered in the same manner as in the previous modes. The latter two operation modes are provided in particular for protecting the operator and the environment surrounding the plant, from the pollution of volatile substances that could exit from the plant during the loading and discharge operations, respectively.

The plant and the method according to the invention advantageously allow to process waste by transforming it into a mass of considerably reduced volume and weight, typically up to 80% and 70% respectively, which can be safely stored for long periods, typically up to six months and beyond. The bulk material obtained with the plant and the method of processing according to the invention is dried, pasteurized or sterilized and it is therefore stable and possibly reusable. Advantageously, the plant and the method according to the invention are adapted to reduce the needs for logistics and waste transport, as well as the $CO_2$ emissions associated with its processing.

SYNTHETIC DESCRIPTION OF THE FIGURES

Some preferred embodiments of the invention will be described below by way of non-limiting example with reference to the accompanying figures in which.

The same references were used in all the figures to distinguish equal or functionally equivalent components.

DESCRIPTION OF SOME PREFERRED EMBODIMENTS OF THE INVENTION

Figure 1:
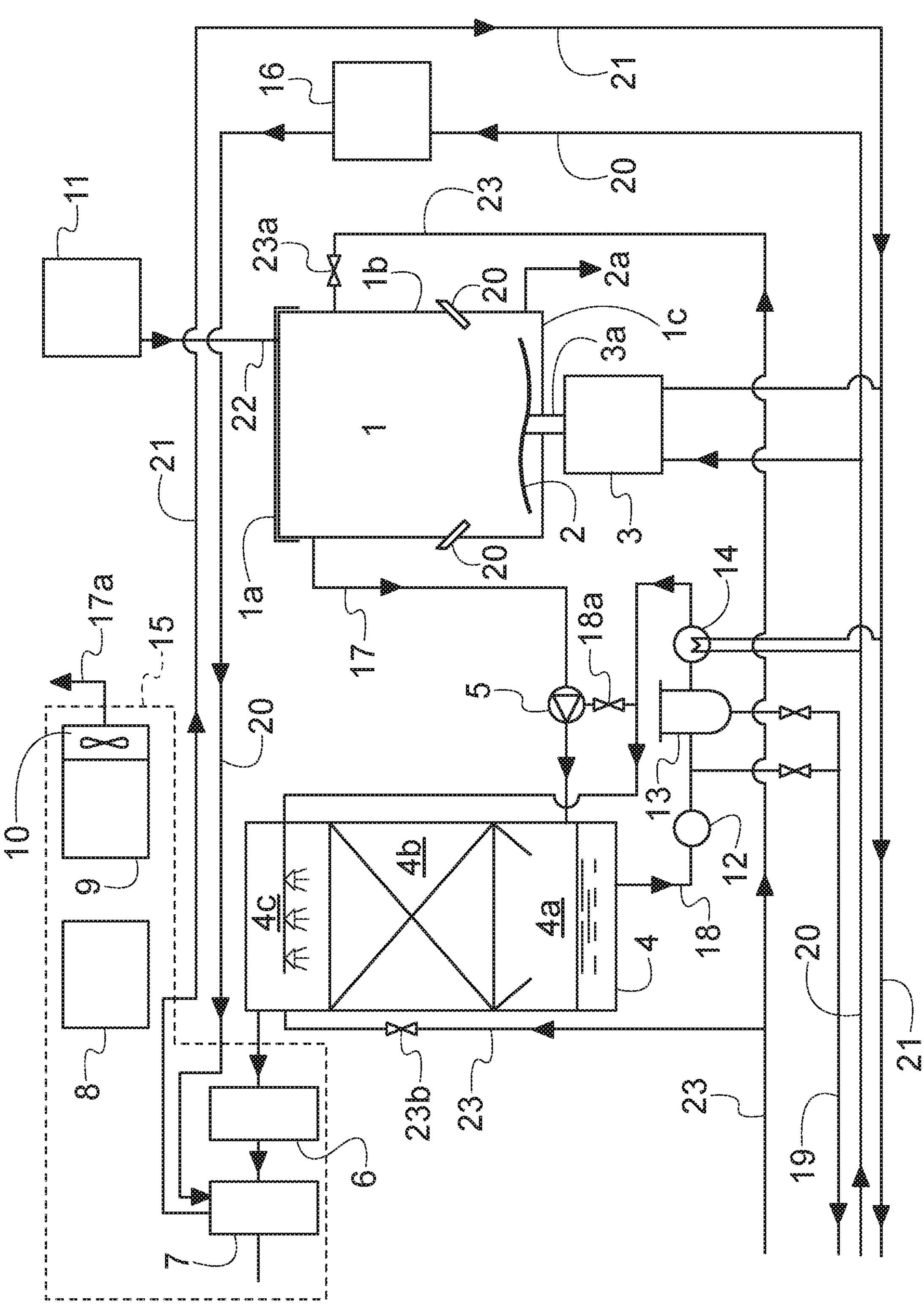
FIG. 1 is a simplified block diagram of a plant made in accordance with a preferred embodiment of the invention.

With reference to FIG. 1, a functional block diagram of the plant object of the present invention is shown in a preferred embodiment. Reference 1 indicates a processing chamber obtained inside a monolithic cell or drum 1*b* provided above with a lid 1*a*. Inside the chamber 1, near the lower base 1*c*, a rotor 2 is provided driven by an electric motor 3 located outside the drum 1*b*. The transmission of motion from the motor 3 to the rotor 2 takes place through a shaft 3*a* passing through the lower base 1*c* of the drum 1*b* at a hole provided therein. Reference 2*a* indicates the discharge duct of the processed waste, which will be mostly in the solid and dried state.

Two series are provided inside the processing chamber 1, each comprising three temperature sensors 20 (two of which are visible in the figure), oriented angularly at about 120° and preferably positioned at different heights for detecting the temperature in the processing chamber 1 in order to control the operation of the plant and avoid overheating. The second series of sensors is advantageously provided to arrange backup sensors in the event of failure of one or more sensors of the first series.

A vertically extending multi-stage separation unit, to which the gaseous effluent from the processing chamber 1 arrives through the duct 17 and by means of a liquid-ring vacuum pump 5, is indicated with reference 4.

The multi-stage separation unit 4 comprises a first lower cyclone stage 4*a*, a second intermediate column stage 4*b* with Raschig ring filling, and a third upper water scrubber stage 4*c*.

A dryer filter, to which the gas and vapour flow discharged above the multi-stage separation unit 4 arrives, is indicated with reference 6. Downstream of the filter 6, a de-saturator filter 7 is provided and downstream of the de-saturator filter 7 an absolute HEPA filter 8 and subsequently an activated-carbon HEGA filter 9 are provided. A suction unit indicated with reference 10 is located downstream of the activated-carbon filter 9 and is adapted to generate the air flow sucked by the multi-stage separation unit 4. The filter 6, the desaturator 7, the HEPA filter 8 and the activated-carbon HEGA filter 9 collectively define a volatile effluent processing unit 15 from which the purified gaseous effluent 17*a* is discharged, preferably released into the environment as it is harmless.

A steam generator, which communicates with the processing chamber 1 through a duct 22, is indicated with reference 11. The purpose of the steam generator is to restore the necessary humidity inside the processing chamber 1.

At the base of the multi-stage separation unit 4 there is a duct 18 for extracting, thanks to a recirculation pump 12, condensate and scrubbing fluid that reaches the base of the separation unit 4. The duct 18 communicates with a filter 13 placed upstream of a heat exchanger 14 and feeds the liquid ring pump 5 and the scrubber 4*c*. A valve 18*a* for regulating the flow is provided to intercept the recirculation fluid directed to the pump 5 and provided for the eventual reintegration of the liquid ring, necessary for the regular operation of said pump 5. Reference 19 indicates a discharge or "blow down" circuit communicating with the duct 18 through valves 12*a*, 12*b*, for the discharge of the excess liquid from the duct 18.

Reference 20 indicates the cooling circuit fed with cooling fluid consisting, for example, of seawater and provided with a refrigeration unit or chiller 16. The cooling circuit 20 is primarily dedicated to cooling the recirculation fluid in the exchanger 14, cooling the motor 3 that drives the rotor 2, and maintaining the operating temperature of the cold operating de-saturator filter 7. Reference 21 indicates the return circuit of the cooling fluid and reference 23 indicates the circuit for supplying the replenishment fluid of the plant, for example fresh water for replenishment, into the chamber 1 and the multi-stage separation unit 4, by means of corresponding shut-off valves 23*a* and 23*b*.

Figure 2:
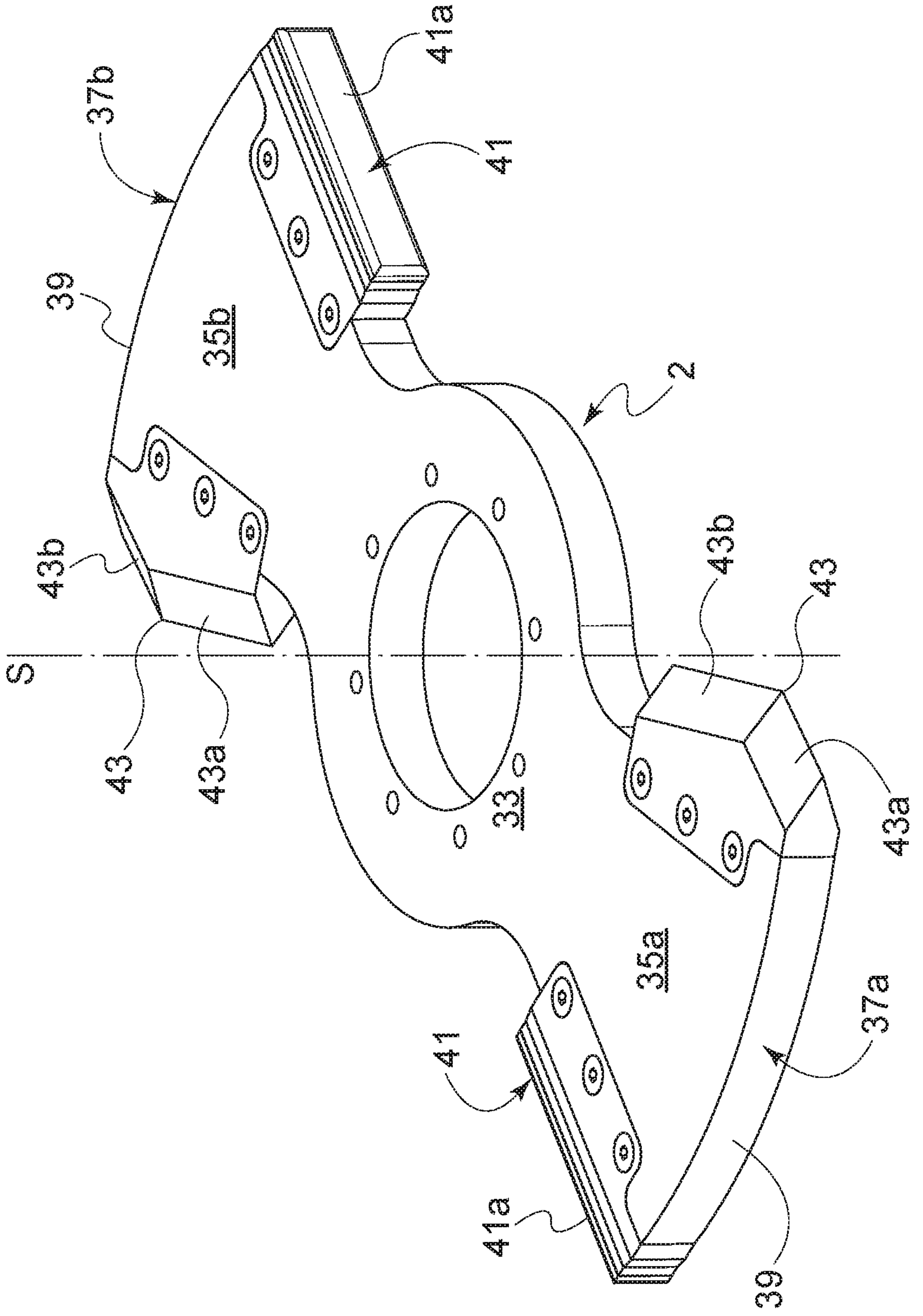
FIG. 2 is a perspective view from above of a pair of vanes in accordance with a preferred embodiment of the invention.

With reference to FIG. 2, the rotor 2 associated with the processing chamber 1 of the grinder is illustrated in detail.

The rotor 2 comprises a central body 33 defining at least one radial vane 35*a*,35*b* provided, at its end 37*a*,37*b* distal relative to the rotation axis "S" of the rotor 2, with a hammerhead 39. In the example shown, a first, knocker impact surface 41, adapted to operate when the rotor 2 rotates in a first, clockwise direction and a second, wedge-shaped impact surface 43, adapted to operate when the rotor 2 rotates in a second direction opposite to the first, counter-clockwise in the example shown, are defined in the hammerhead 39.

The first, knocker impact surface 41 extends on a single plane 41*a* substantially parallel to the rotation axis "S" of the rotor 2. Furthermore, in the example shown, the plane 41*a* on which the knocker impact surface 41 extends is substantially perpendicular to the angular direction of rotation of the rotor 2. More precisely, in the embodiment shown, said plane is furthermore tangent to an imaginary cylinder with its axis coinciding with the rotation axis "S" of the rotor 2 and preferably contained in the body of the rotor 2, i.e., with the generatrices of said imaginary cylinder intercepting the body of the rotor 2.

The second, wedge-shaped impact surface 43 extends on a pair of planes 43*a*,43*b* inclined relative to the plane of rotation of the rotor 2 perpendicular to the rotation axis "S". In addition, the planes 43*a*,43*b* are inclined relative to each other.

Said two planes 43*a*,43*b* on which the second surface 43 extends are inclined at a corresponding angle between 15° and 90°, preferably about 30° with respect to the plane of rotation. Moreover, said two planes 43*a*,43*b* on which the second surface 43 extends are inclined at an angle $\beta$ between 90° and 180°, preferably about 120°, relative to each other.

Advantageously, according to a preferred embodiment of the invention, the rotor 2 is rotated counter-clockwise to make the wedge-shaped impact surfaces 43 work to shred the waste received in the chamber 1, and in the opposite direction to increase the temperature and fluidize the waste by impacting the knocker impact surfaces 41 and the sliding of the material against the walls of the chamber 1. Inside the chamber 1, radial buffers (not shown) can optionally be provided which cooperate with the knocker impact surfaces 41 to increase the temperature raising effect.

According to a preferred embodiment of the invention, in the step in which the surfaces 43 operate, the impeller speed is preferably kept constant. Still according to the invention, in the step in which the knocker impact surfaces 41 operate, it is instead preferably varied according to the torque estimated by measuring the current absorbed by the motor 3. Advantageously, the speed variation as a function of the torque allows to avoid triggering the floating of the fluidized mass of waste that would escape the action of the rotor 2 as it will be pushed to the surface in the processing chamber 1. The speed variation is preferably carried out so as to maintain the torque substantially constant.

Figure 3:
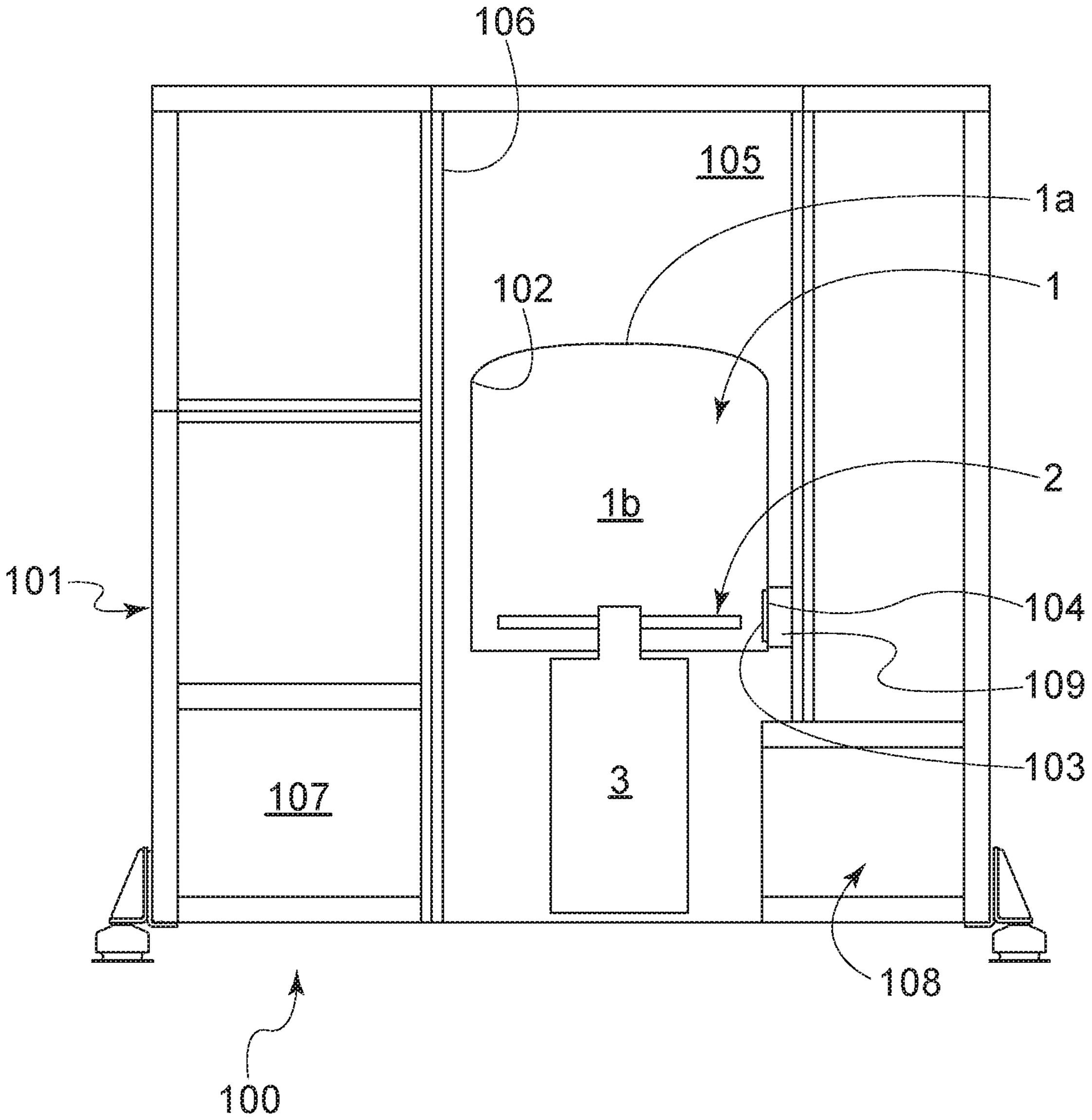
FIG. 3 is a front-plan schematic view of the plant according to a preferred embodiment of the invention.

Referring to FIG. 3, a plant 100 made in accordance with a preferred embodiment of the invention is shown schematically.

In FIG. 3 reference 101 indicates the outer housing of the plant 100 and reference 1*b* indicates a grinding cell in which a grinding chamber 1 is defined. The chamber 1 is provided with an inlet opening or mouth 102, for introducing the waste to be processed, and at least one outlet opening or mouth 103, for discharging the material resulting from the waste processing. The openings 102 and 103 are provided with a corresponding closure element 1*a* and 104, adapted to isolate the grinding chamber 1 from the outer environment. In the embodiment shown, the closure element 1*a* comprises a lid hinged to the wall of the cell 1*b* and driven by an actuator. The closure element 104 comprises a bulkhead, movable radially with respect to the cylindrical body of the cell 1*b* and actuated by an actuator. The actuators of the lid 1*b* and bulkhead 104 may, for example, be of an electrical or pneumatic type and controlled by an electronic unit responsible for coordinating the functions of the plant 100. The outer housing 101 defines therein a space 105 in which the cell 1*b* is received and which integrally surrounds said cell.

The outer housing 101 comprises, in the embodiment shown, a support frame 106 and a plurality of panels 107 attached to the frame 106 and defining the walls of said space 105 in which the grinding cell 1*b* is received.

The outer housing 101 further defines therein a collection chamber 108 for the material discharged from the grinding cell 1*b*. The collection chamber 108 is in communication with the grinding chamber 1 defined within the cell 1*b*, through a duct 109.

The grinding chamber 1 houses a rotor 2 provided with a pair of radial vanes 35*a*,35*b* equipped, at their ends distal relative to the rotation axis, with a hammerhead in which two opposite impact surfaces 41,43 are defined, said impact surfaces operating, respectively, when the rotor 2 rotates clockwise or counter-clockwise.

Figure 4A:
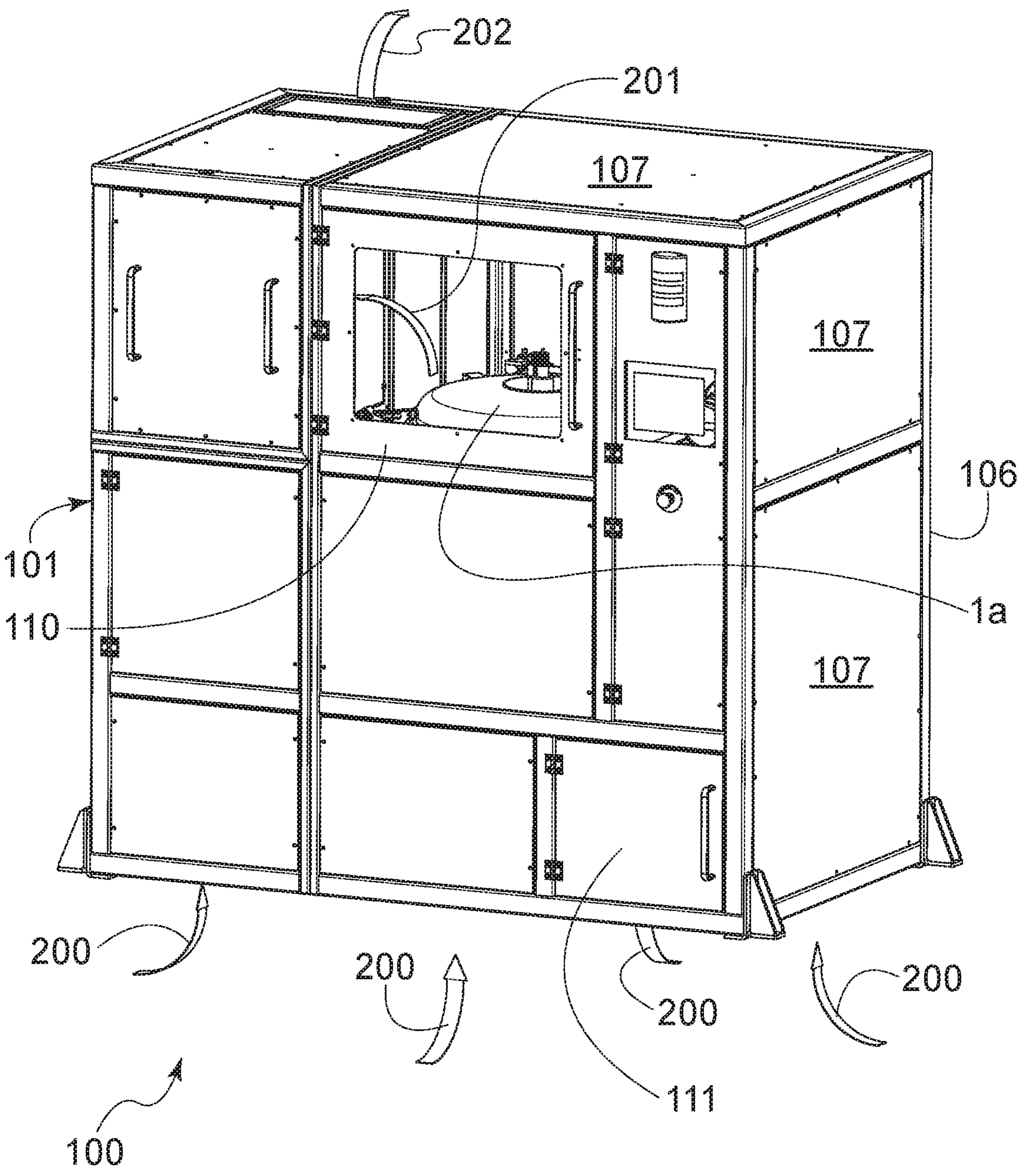
FIGS. 4A to 4D are perspective views of the plant of FIG. 3, in as many operating steps.

Referring to FIG. 4A, the path of the washing air flow induced by the suction unit 10 and corresponding to a first operation mode of the plant 100 is schematically shown, which path of the washing air flow is aimed at extracting heat from the processing chamber 1 provided in the cell 1*b*, to avoid the excessive increase of the temperature in said cell 1*b* during the operation of the grinder, i.e., when the lid 1*b* is closed. The air sucked by the suction unit 10 at the top of the plant 100 enters the housing 101 through dedicated openings provided at the base of the housing 101 (arrows 200), crosses the space 105 defined inside the housing 101, brushing the surfaces that the air flow encounters during transit and subtracting heat (arrows 201). The air flow sucked by the suction unit 10 is filtered by the air treatment unit 15 and is finally released into the outer environment surrounding the plant 100 (arrow 202).

In this operation mode, the door 110 that closes the space 105 and the door 111 that closes the collection chamber 108 are closed so that the air sucked by the suction unit 10 substantially enters only the base of the housing 101.

Figure 4B:
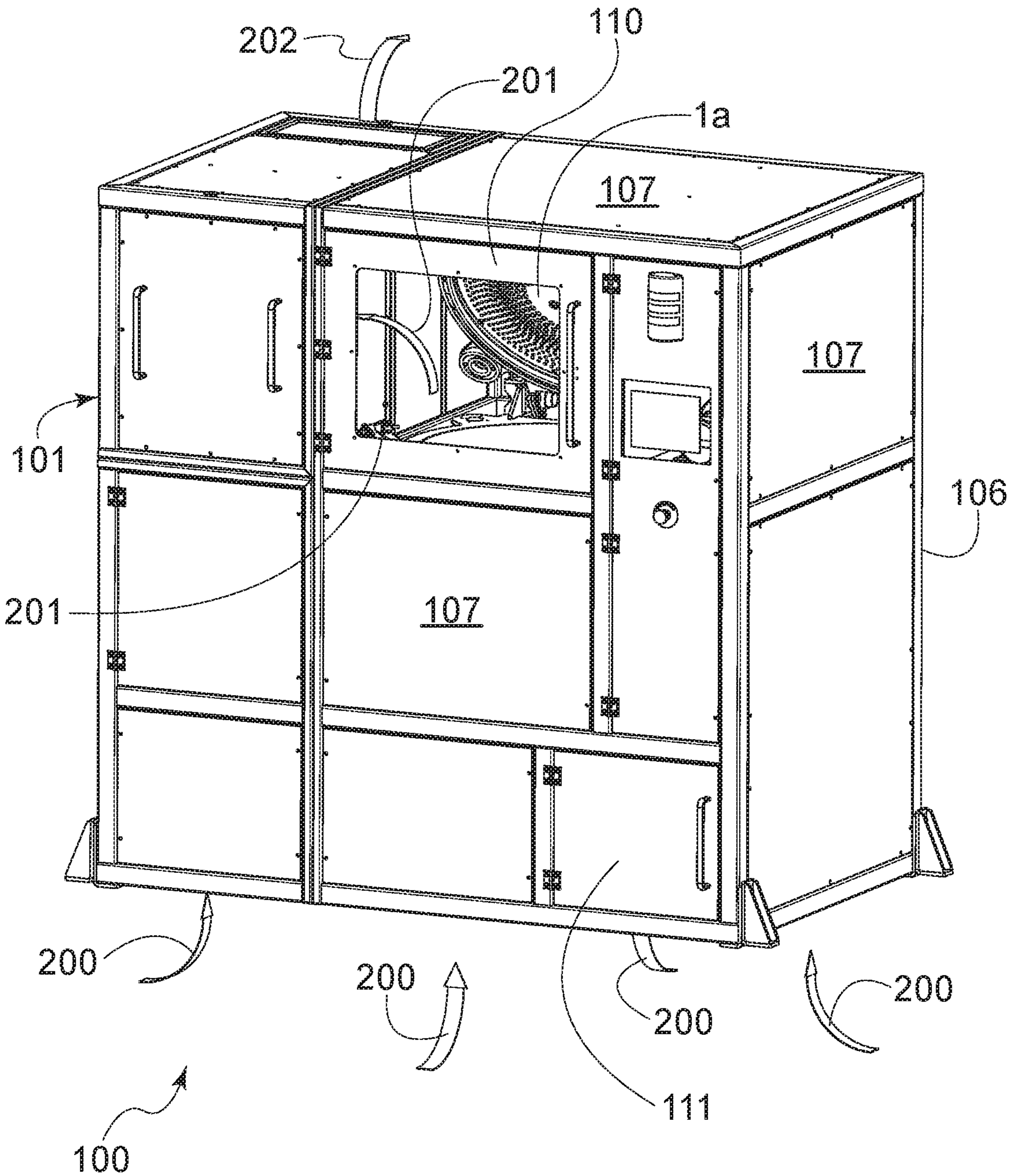

Referring to FIG. 4B, the path of the washing air flow induced by the suction unit 10 and corresponding to a second operation mode of the plant 100 and aimed at removing the powder that is created inside the loading section of the space 105 when the lid 1*a* of the processing chamber 1 is opened at the end of the waste processing is schematically shown. The air flow path is substantially the same as in the first described mode.

Figure 4C:
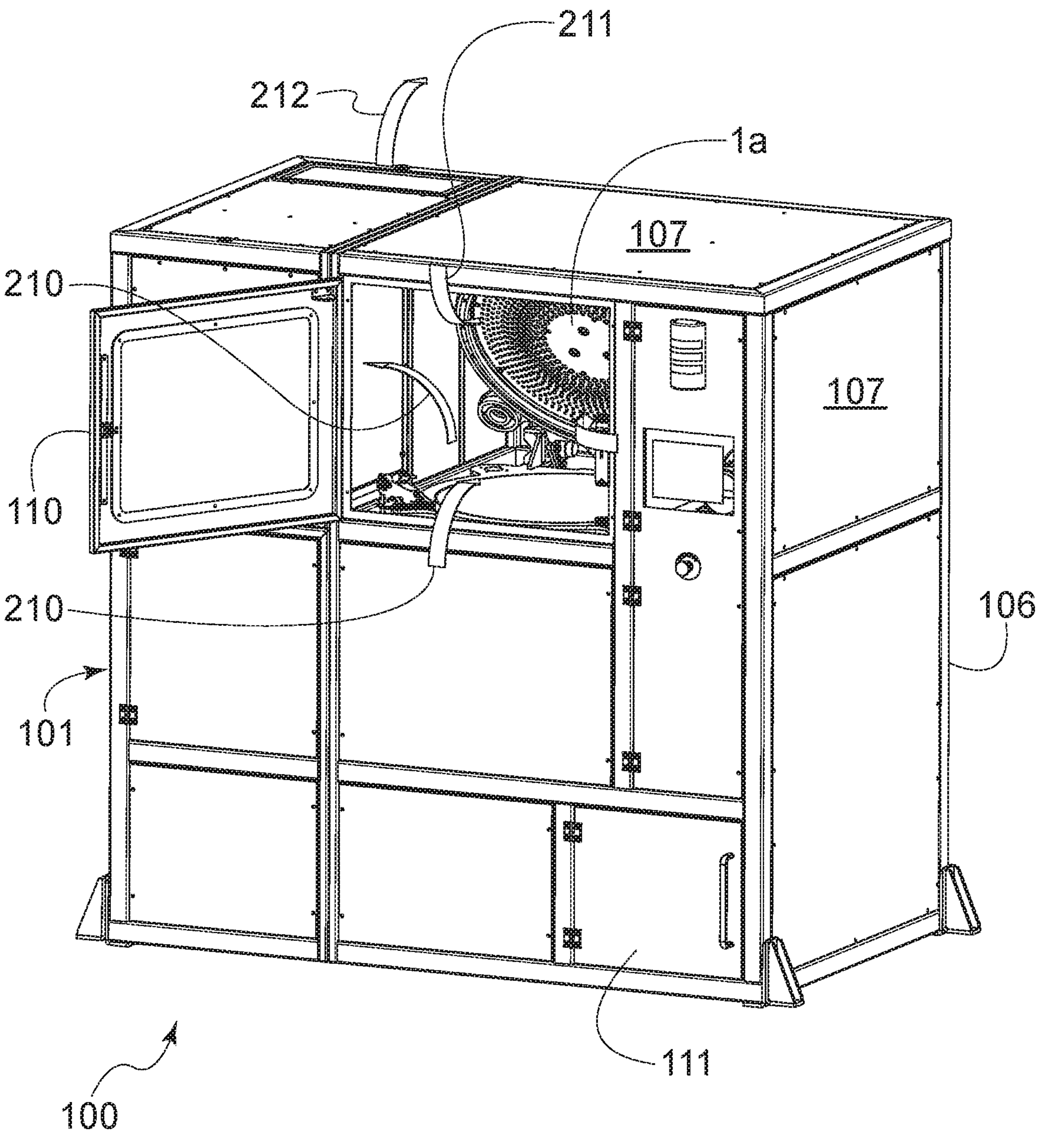

Referring to FIG. 4C, the path of the washing air flow induced by the suction unit 10 and corresponding to a third operation mode of the plant 100 and aimed at sucking air from the loading section of the space 105 during the loading of waste when the door 110 for access to said loading section of the space 105 is open and the lid 1*a* of the cell 1*b* is also open is schematically shown.

The air sucked by the suction unit 10 placed at the top of the plant 100 enters the housing 101 through the front opening created when the door 110 is open (arrows 210), crosses the space 105 defined inside the housing 101, brushing the surfaces that the air flow encounters during transit and consequently subtracting the dust and other volatile substances (arrows 211) and blocking the exit towards the front part of the plant. The air flow sucked by the suction unit 10 is filtered by the air treatment unit 15 and is finally released into the outer environment surrounding the plant 100 (arrow 212).

Figure 4D:
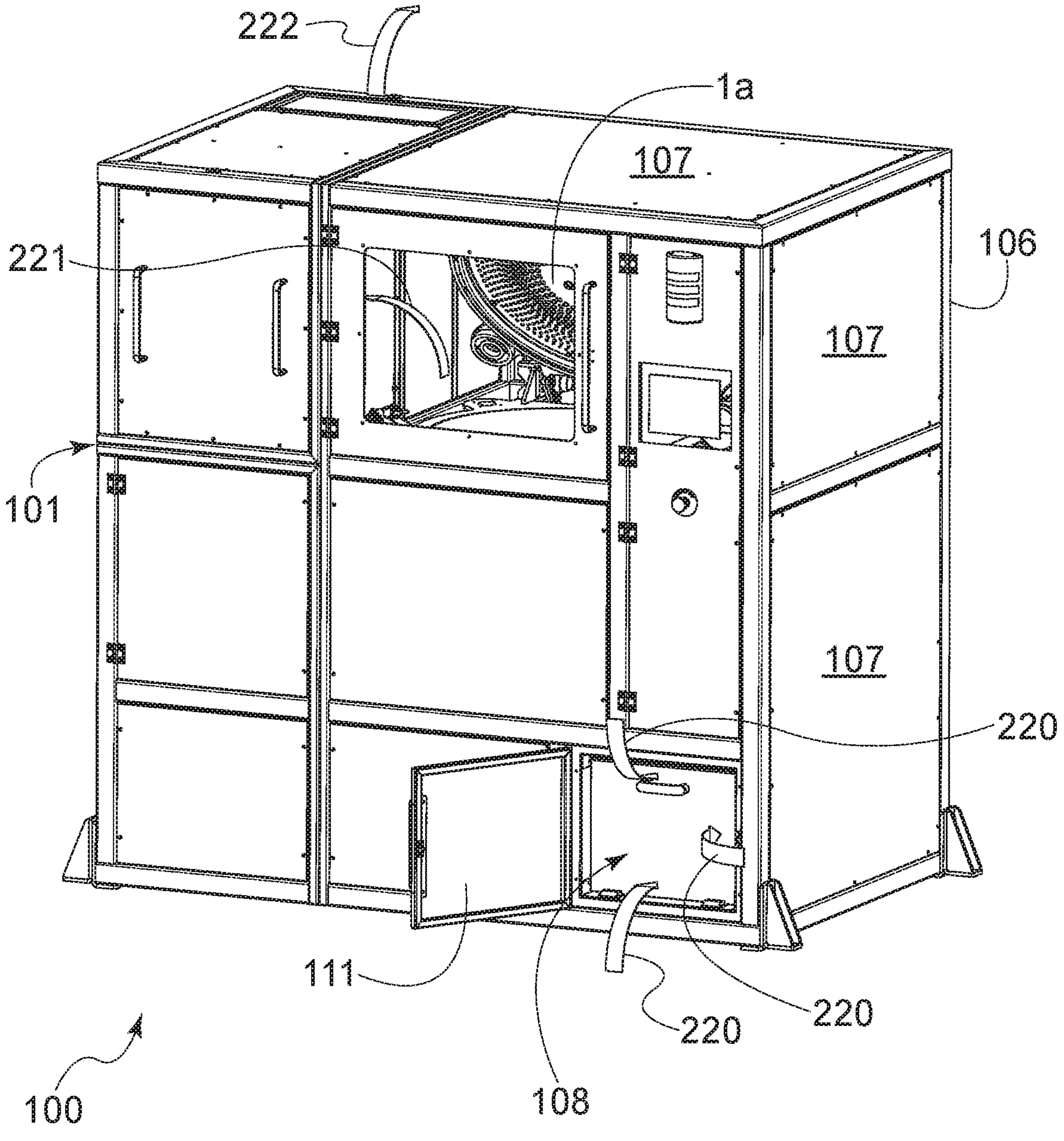

Referring to FIG. 4D, the path of the washing air flow induced by the suction unit 10 and corresponding to a fourth operation mode of the plant 100 and aimed at sucking air from the discharge section of the space 105 in which the collection chamber 108 is defined during the discharge of the waste when the access door 111 to said collection chamber 108 is open is schematically shown. In this mode, the air sucked by the suction unit 10 enters from the access opening to the discharge section of the space at a speed suitable to prevent dust and volatile components exiting from said discharge section (arrows 220). The sucked air flow passes through the discharge section of the space 105, the communication duct 109 with the processing chamber 1, the discharge outlet 103, the processing chamber 1 and exits into the loading section of the space 105 through the opening or loading mouth 102 provided to access the processing chamber 1. The air flow flowing outside the processing chamber 1 (arrow 221) is subsequently filtered in the same manner as in the previous modes and discharged outside the housing 101 (arrow 222).

Advantageously, the latter two operation modes are provided in particular for protecting the operator and the environment surrounding the plant, from the pollution of volatile substances that could exit from the plant during the loading and discharge operations, respectively.

INDUSTRIAL APPLICABILITY

The plant according to the invention is capable of operating with a wide range of waste flows, in particular of the type produced on board boats, ranging from undifferentiated waste to separate recyclable materials.

The invention claimed is:

1. A plant for waste processing, comprising an outer housing (101) and a grinding cell (1*b*), in which a grinding chamber (1) is defined having at least one inlet opening (102) for introducing waste to be processed, and at least one outlet opening (103) for discharging material resulting from the waste processing, said inlet and outlet openings (102, 103) being associated with a corresponding closure element (la, 104), that isolates the grinding chamber (1) from an outer environment, wherein said outer housing (101) defines therein a space (105) receiving the grinding cell (1*b*) and integrally surrounds said grinding cell (1*b*), and in that said space (105) is accessible through at least one door (110, 111), wherein the outer housing (101) houses a system capable of generating a washing air flow (200, 201, 202; 210, 211, 212; 220, 221, 222) of the space (105) housing the grinding cell (1*b*), said washing air flow being conveyed into an effluent processing system of which the plant is equipped, wherein the plant further comprises a suction unit (10) located at a top of the plant and dedicated openings provided at a base of the outer housing (101) so that air sucked by the suction unit (10) defines said washing air flow as an upward air flow passing through said space (105) and brushing a lateral wall of the grinding cell (1*b*).

2. The plant according to claim 1, wherein the outer housing (101) comprises a support frame (106) and a plurality of panels (107) attached to the frame (106) and defining walls of said space (105) in which the grinding cell (1*b*) is received, and wherein at least one of said panels (107) comprises the at least one door (110,111) which is openable.

3. The plant according to claim 2, wherein the outer housing (101) defines therein a collection chamber (108) for the material discharged from the grinding cell (1*b*), said collection chamber (108) being in communication with the grinding chamber (1) defined within the grinding cell (1*b*) through a duct (109).

4. The plant according to claim 3, wherein the grinding chamber (1) houses a rotor (2) provided with at least one radial vane (35*a*, 35*b*) provided, at its end (37*a*, 37*b*) distal relative to a rotation axis ("S"), with a hammerhead (39) in which two opposite impact surfaces (41, 43) are defined, said impact surfaces operating when the rotor rotates clockwise or counter-clockwise, respectively, a first one (41) of the impact surfaces being flat and perpendicular to an angular direction of rotation of the vane, and the other impact surface (43) being variously inclined.

5. The plant according to claim 4, wherein the grinding cell (1*b*) is equipped with at least three temperature sensors (20) arranged along corresponding generatrices of the grinding chamber (1) of the grinding cell (1*b*) angularly spaced from one another by about 120°, at different heights relative to the base (1*c*) of the grinding cell (1*b*), in corresponding radial bores provided in a grinding cell wall, said sensors (20) being adapted to generate a corresponding signal indicative of the temperature measured inside the grinding cell.

6. The plant according to claim 2, wherein the grinding chamber (1) houses a rotor (2) provided with at least one radial vane (35*a*, 35*b*) provided, at its end (37*a*, 37*b*) distal relative to a rotation axis ("S"), with a hammerhead (39) in which two opposite impact surfaces (41,43) are defined, said impact surfaces operating when the rotor rotates clockwise or counter-clockwise, respectively, a first one (41) of the impact surfaces being flat and perpendicular to an angular direction of rotation of the vane, and the other impact surface (43) being variously inclined.

7. A method for processing of waste, comprising the steps of:

providing a plant according to claim 1, opening the closure element (la) closing the inlet opening (102) of the grinding cell;

opening the door (110) in order to access the space (105) in which the grinding cell (1*b*) is housed;

loading the grinding cell (1*b*) with a certain amount of waste;

closing the inlet opening (102) of the grinding cell (1*b*) by means of the corresponding closure element (la);

closing the door (110) for isolating the space (105) receiving the grinding cell (1*b*) from the outer environment;

starting a grinding step; and generating the washing air flow (200, 201, 202; 210, 211, 212; 220, 221, 222) through the space (105) housing the grinding cell (1*b*), said washing air flow being conveyed into the effluent processing system of which the plant is equipped;

wherein said washing air flow, defined as the upward air flow, passes through the space (105) housing the grinding cell (1*b*) and, by brushing the lateral wall of the grinding cell (1*b*), contributes to cooling of the grinding cell (1*b*);

wherein said upward air flow is maintained during the loading step of the grinding cell (1*b*) to prevent release of dust from the space (105) through an opening created by opening the door (110) provided on the outer housing (101) through which waste to be processed is introduced into the space (105); and wherein the method further comprises a step in which an access door (111) to a collection chamber within the outer housing (101) is opened and material processed within the grinding cell (1*b*) is discharged from the outer housing (101), such that the upward air flow is maintained when the access door (111) is open to prevent volatile material from exiting the outer housing (101) through an opening of the outer housing created by opening of the access door (111) while the material processed is discharged from the collection chamber.

8. The method according to claim 7, wherein a piped effluent exiting the grinding cell (1*b*) during the processing of said waste is processed by a vertically extending multi-stage separation unit (4), said unit comprising a first cyclone separator stage (4*a*), adapted to remove larger particles.

9. The method according to claim 8, wherein the grinding step comprises:

a first step in which a rotor (2) is rotated in a first, clockwise or counter-clockwise direction for operating with a first wedge-shaped impact surface (43) of a vane (35*a*, 35*b*) associated with the rotor (2); and a second step in which the rotor (2) is rotated in a second, opposite direction for operating with a second, knocker impact surface (41) of a vane (35*a*, 35*b*) associated with the rotor (2).

10. The method according to claim 9, wherein in the step of rotation in the first direction, the rotor (2) is driven at a constant speed, and wherein in the second step of rotation in the second, opposite direction, the rotor (2) is driven at a constant torque.

11. The method according to claim 7, wherein the grinding step comprises:

a first step in which a rotor (2) is rotated in a first, clockwise or counter-clockwise direction for operating with a first wedge-shaped impact surface (43) of a vane (35*a*, 35*b*) associated with the rotor (2); and a second step in which the rotor (2) is rotated in a second, opposite direction for operating with a second, knocker impact surface (41) of a vane (35*a*, 35*b*) associated with the rotor (2).

12. The method according to claim 11, wherein in the step of rotation in the first direction, the rotor (2) is driven at a constant speed, and wherein in the second step of rotation in the second, opposite direction, the rotor (2) is driven at a constant torque.

13. The plant according to claim 1, wherein the outer housing (101) defines therein a collection chamber (108) for the material discharged from the grinding cell (1*b*), said collection chamber (108) being in communication with the grinding chamber (1) defined within the grinding cell (1*b*) through a duct (109).

14. The plant according to claim 1, wherein the grinding chamber (1) houses a rotor (2) provided with at least one radial vane (35*a*, 35*b*) provided, at its end (37*a*, 37*b*) distal relative to a rotation axis ("S"), with a hammerhead (39) in which two opposite impact surfaces (41,43) are defined, said impact surfaces operating when the rotor rotates clockwise or counter-clockwise, respectively, a first one (41) of the impact surfaces being flat and perpendicular to an angular direction of rotation of the vane, and the other impact surface (43) being variously inclined.

15. The plant according to claim 1, wherein the grinding cell (1*b*) is equipped with at least three temperature sensors (20) arranged along corresponding generatrices of the grinding chamber (1) of the grinding cell (1*b*) angularly spaced from one another by about 120°, at different heights relative to the base (1*c*) of the grinding cell (1*b*), in corresponding radial bores provided in a grinding cell wall, said sensors (20) being adapted to generate a corresponding signal indicative of the temperature measured inside the grinding cell.

* * * * *